United States Patent
Drepper

(10) Patent No.: US 11,960,420 B2
(45) Date of Patent: Apr. 16, 2024

(54) DIRECT MEMORY CONTROL OPERATIONS ON MEMORY DATA STRUCTURES

(71) Applicant: Red Hat, Inc., Raleigh, NC (US)

(72) Inventor: Ulrich Drepper, Grasbrunn (DE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/177,181

(22) Filed: Feb. 16, 2021

(65) Prior Publication Data
US 2022/0261366 A1 Aug. 18, 2022

(51) Int. Cl.
*G06F 13/28* (2006.01)
*G06F 12/06* (2006.01)

(52) U.S. Cl.
CPC ............ *G06F 13/28* (2013.01); *G06F 12/06* (2013.01); *G06F 2212/1024* (2013.01)

(58) Field of Classification Search
None
See application file for complete search history.

(56) References Cited

U.S. PATENT DOCUMENTS

| | | | | |
|---|---|---|---|---|
| 5,754,436 | A * | 5/1998 | Walsh | G06F 9/30083 700/286 |
| 6,591,310 | B1 * | 7/2003 | Johnson | G06F 13/387 710/33 |
| 7,529,786 | B2 | 5/2009 | Andreasson | |
| 8,601,036 | B2 | 12/2013 | Nalla et al. | |
| 9,727,456 | B2 | 8/2017 | Malwankar et al. | |
| 9,830,297 | B2 * | 11/2017 | Cappaert | G06F 13/4282 |
| 9,842,075 | B1 * | 12/2017 | Davis | G06F 13/4295 |
| 10,592,215 | B1 | 3/2020 | Eyberg | |
| 10,621,106 | B1 * | 4/2020 | Campbell | G06F 12/1045 |
| 10,642,663 | B2 | 5/2020 | Harris | |
| 11,221,963 | B2 * | 1/2022 | Campbell | G06F 12/1018 |
| 2007/0067435 | A1 * | 3/2007 | Landis | G06F 9/4555 709/224 |
| 2011/0231685 | A1 * | 9/2011 | Huang | G06F 1/3253 710/14 |
| 2013/0082662 | A1 * | 4/2013 | Carre | H02J 7/00 320/134 |

(Continued)

OTHER PUBLICATIONS

Goh, Okehee, et al., CSE, Arizona State University, Tempe, AZ, Honeywell International Inc. Phoenix, AZ, "Integrated Scheduling with Garbage Collection for Real-Time Embedded Applications in CLI", https://ieeexplore.ieee.org/document/1630468, 2006, 8 pages.

(Continued)

*Primary Examiner* — Henry Tsai
*Assistant Examiner* — Christopher A Bartels
(74) *Attorney, Agent, or Firm* — Womble Bond Dickinson (US) LLP

(57) ABSTRACT

Systems and methods for direct memory control operations on memory data structures. In one implementation, a processing device receives, from a component of an application runtime environment, a request to perform a memory access operation on a portion of a memory space; determines a data structure address for a portion of a memory data structure, wherein the portion of the data structure is associated with the portion of the memory space; and performs, in view of the data structure address, the memory access operation directly on the portion of the memory data structure.

18 Claims, 5 Drawing Sheets

(56) References Cited

U.S. PATENT DOCUMENTS

| | | | | |
|---|---|---|---|---|
| 2014/0122830 A1* | 5/2014 | Cohen | ................ | G06F 12/1027 |
| | | | | 711/207 |
| 2015/0134930 A1* | 5/2015 | Huang | ................ | G06F 3/0664 |
| | | | | 711/206 |
| 2015/0220354 A1* | 8/2015 | Nair | ................ | G06F 3/0664 |
| | | | | 710/308 |
| 2015/0281126 A1* | 10/2015 | Regula | ................ | G06F 13/4022 |
| | | | | 709/212 |
| 2016/0154756 A1* | 6/2016 | Dodson | ................ | G06F 13/4022 |
| | | | | 710/316 |
| 2016/0350261 A1* | 12/2016 | Tsirkin | ................ | G06F 15/17331 |
| 2016/0366226 A1* | 12/2016 | Friedman | ................ | G06F 3/0608 |
| 2017/0177854 A1* | 6/2017 | Gligor | ................ | G06F 21/572 |
| 2017/0235562 A1* | 8/2017 | Bafna | ................ | G06F 21/78 |
| | | | | 718/1 |
| 2018/0136851 A1* | 5/2018 | Batra | ................ | G06F 3/0685 |
| 2019/0102171 A1* | 4/2019 | Tashiro | ................ | G06F 9/3016 |
| 2019/0227714 A1* | 7/2019 | Duncan | ................ | G06F 3/0659 |
| 2019/0347125 A1* | 11/2019 | Sankaran | ................ | G06F 9/383 |
| 2020/0004953 A1* | 1/2020 | Lemay | ................ | G06F 21/53 |
| 2020/0142878 A1* | 5/2020 | Varadarajan | ................ | G06F 12/0253 |
| 2020/0175000 A1* | 6/2020 | Borrill | ................ | G06F 16/2379 |
| 2020/0264941 A1* | 8/2020 | Drepper | ................ | G06F 9/545 |
| 2020/0358860 A1* | 11/2020 | Venkataraman | ................ | H04L 67/148 |
| 2021/0200546 A1* | 7/2021 | Lemay | ................ | G06F 9/45558 |
| 2022/0046114 A1* | 2/2022 | Entelis | ................ | H04L 12/40 |
| 2022/0206830 A1* | 6/2022 | Eyberg | ................ | H04L 63/02 |
| 2023/0176983 A1* | 6/2023 | Parker | ................ | G06F 12/1441 |
| | | | | 711/163 |

OTHER PUBLICATIONS

Madhavapeddy, Anil, et al., University of Cambridge, University of Nottingham; Citrix Systems Ltd; OCamlPro SAS, "Unikernels: Library Operating Systems for the Cloud", http://unikernel.org/files/2013-asplos-mirage.pdf, Mar. 16-20, 2013, 12 pages.

* cited by examiner

DIRECT MEMORY CONTROL OPERATIONS ON MEMORY DATA STRUCTURES

TECHNICAL FIELD

The present disclosure is generally related to computer systems, and more particularly, to direct memory control operations on memory data structures in computer systems.

BACKGROUND

Concurrent computing is a form of computing in which multiple computations can execute concurrently—during overlapping time periods—rather than sequentially, where one computation completes before the next starts. A concurrent system is one where a computation can advance without waiting for all other computations to complete. In concurrent computing systems, there can be a separate execution point or "thread" for each process.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
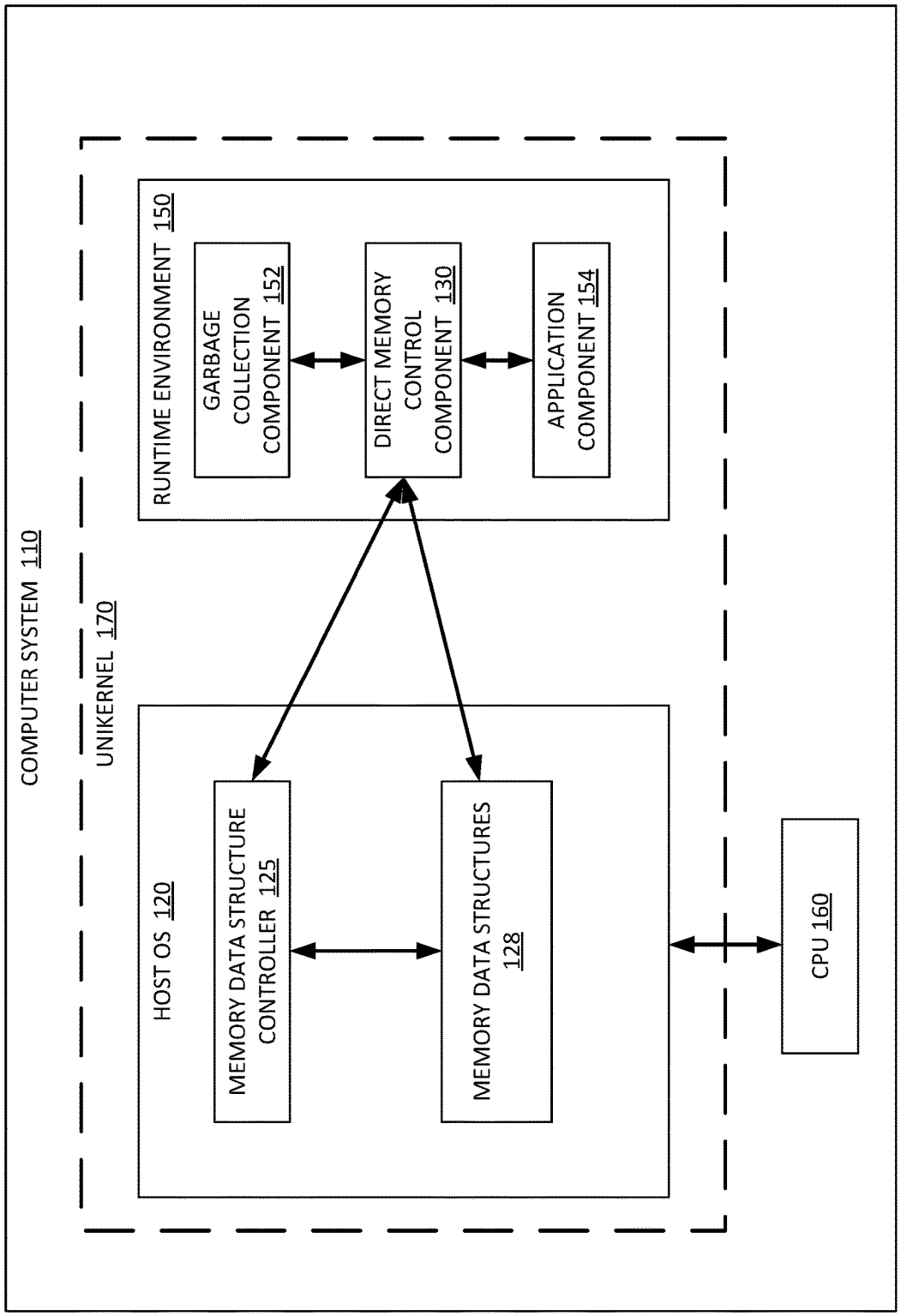
FIG. 1 depicts a high-level diagram of an example system architecture operating in accordance with one or more aspects of the present disclosure.

Described herein are methods and systems for facilitating direct memory control operations on memory data structures.

Concurrent programming languages are programming languages that use language constructs for concurrency, such as Java™, C#™, Python™, or the like. The constructs used by these types of programming languages can involve multi-threading, support for distributed computing, message passing, and shared resources such as shared memory. Conventional systems implemented with these types of languages often use a shared-memory concurrency model, where some form of memory locking is implemented to coordinate memory accesses between threads. In such instances, memory access operations (such as memory locking) are typically provided by components of the operating system (OS) that are accessed using standardized interfaces (e.g., system calls).

Conventional systems that implement concurrency in this way can provide throughput benefits, since multiple threads can execute at the same time, even when sharing resources. These types of implementations, however, can often lead to performance bottlenecks when multiple threads attempt to utilize the same areas of memory. Additionally, conventional systems often implement some form of garbage collection, which is the process of reclaiming unused memory within the application runtime environment automatically. Typically, garbage collection operations can attempt to access memory spaces that may be accessed by active application threads. In such instances, a garbage collection component of the runtime environment may typically lock large areas of memory, preventing it from being accessed by any active thread. Active threads attempting to access locked memory wait unit the locked memory has been released.

Conventional systems typically provide access to memory structures via system calls using standard interfaces. These types of interfaces, however, may involve a large number of extraneous instructions that may not be necessary to perform particular memory access operations. For example, a garbage collection operation may only need to set a particular bit of a memory data structure to lock a particular page, but a standard interface may involve other instructions that are not needed by the actual garbage collection operations. Additionally, conventional interfaces typically lock much more memory than that necessary to perform the operation (e.g., a block of data rather than a page). In such instances, employing the standard interface can result in locking more pages than are necessary for much longer periods of time. While intensive locking/unlocking of the memory would allow for more parallelism, such locking/unlocking would require a significant number of system calls for memory control. Depending upon the level of consumption of computational resources by such memory control calls, implementing such parallelism may or may not be a resource-efficient strategy.

Furthermore, locking the memory would lead to halting at least some of the running application threads. Moreover, since the standard interfaces perform many more operations than may be necessary, those threads are halted for longer periods of time, resulting in significantly reduced throughput for the overall system.

Aspects of the present disclosure address the above noted and other deficiencies by implementing technology to facilitate direct memory control operations on memory data structures. In various implementations, aspects of the present disclosure can utilize a specialized interface to obtain access to memory data structures, bypassing the significant number of instructions performed by standard memory access interfaces. An application component, garbage collection component, or other component of a concurrent system application runtime environment can utilize the specialized interface to obtain an address of a particular element of a memory data structure (e.g., the address of a memory page stored in a memory page table tree). Subsequently, the application component, garbage collection component, etc. can use the obtained address to access the memory data structure directly, bypassing the standard interface entirely.

In one implementation, a direct memory control component can receive a request from another component of an application runtime environment to perform a memory access operation on a portion of memory. The direct memory control component can determine a memory data structure address for a portion of a memory data structure that is associated with the portion of memory specified by the request. The direct memory control component can subsequently perform the memory access operation directly on the memory data structure specified by the memory data structure address.

In some implementations, aspects of the present disclosure can be implemented as part of a unikernel. A unikernel is a specialized implementation that combines an application runtime with host operating system (OS) for a particular purpose. In such instances, the application runtime and host OS can be deployed as a single entity that operate within a single address space, eliminating any segregation between user space and operating system (e.g., kernel) space. In unikernel implementations, the compiler can generate the unikernel such that the instructions of the direct memory control component can be incorporated into the components that may access it (e.g., application component, garbage collection component, etc.), providing inline access to the memory data structures directly without the intervention of the host OS.

Aspects of the present disclosure present advantages over conventional solutions to the issues noted above. First, the specialized interface can bypass a significant number of extraneous instructions performed by standard system call interfaces, reducing the processing time and resources necessary to perform memory access operations. This, in turn, can significantly reduce the time an area of memory may be locked, and therefore reduce the time application threads are halted. Additionally, by providing the ability to access memory data structures directly, the amount of memory affected by any operation can be limited, which can significantly reduce the impact of any memory locking operation on application threads. Moreover, directly accessing the memory data structures can bypass standard interfaces entirely, further reducing the processing time for memory access operations. This can result in a significant increase in processing throughput since application threads can be halted for much short durations. Moreover, in unikernel implementations, the performance improvements noted above can be significantly increased since the OS and application runtime can be implemented in the same memory space.

FIG. 1 depicts an illustrative architecture of elements of a computer system 110, in accordance with an embodiment of the present disclosure. It should be noted that other architectures for host computer system 110 are possible, and that the implementation of a computer system utilizing embodiments of the disclosure are not necessarily limited to the specific architecture depicted by FIG. 1. Computer system 110 may comprise one or more processors communicatively coupled to memory devices and input/output (I/O) devices. Computer system 110 runs a host operating system (OS) 120, which can comprise software that manages the hardware resources of the computer system and that provides functions such as inter-process communication, scheduling, virtual memory management, and so forth.

Host OS 120 may additionally include a memory data structure controller 125 that provides components of host OS 120 access to memory data structures 128. In various implementations, memory data structure controller 125 can be invoked by other components (not pictured) of the host OS 120 which are exposed to runtime environment 150 via standard system call interfaces. For example, in the Linux kernel, an application can issue a system call to the mprotect function to control access to memory pages. This function can cause a component of host OS 120 to invoke memory data structure controller to identify the appropriate portions of the memory data structures 128 to access in order to facilitate the memory protection operation. As shown, memory data structure controller 125 can also be invoked by direct memory control component 130 via a specialized interface exposed to runtime environment 150, which is explained in further detail below.

As noted above, host OS 120 can also include memory data structures 128. In various implementations, memory data structures 128 can include data structures that are accessible to the CPU of computer system 110 to manage the memory allocated to the system. For example, the memory data structures 128 can include a memory page table tree data structure that is used to map virtual addresses associated memory pages allocated to runtime environment 150 to physical addresses of the memory of computer system 110. In such instances, a node in the page table tree can be associated with a memory page associated with the runtime environment 150. Thus, when a memory page is allocated, deallocated, relocated, protected, unprotected, etc., the associated node of the page table tree (or other data structure) can be accessed and/or updated accordingly.

Computer system 110 can also include runtime environment 150. In various implementations, runtime environment 150 can include one or more components that execute within the environment. For example, application components (e.g., application components 154) that are deployed using programming languages such as Java™, Python™, or the like, can be deployed within runtime environment 150 that include the application component as well as other related components that perform other operations such as garbage collection (e.g., garbage collection component 152). An application component 154 that modifies or otherwise interacts with memory can cause the runtime environment 150 to perform garbage collection operations on memory spaces that are accessible to the runtime environment. In such instances, the runtime environment 150 (or the application component 154) can invoke garbage collection 152 to perform the garbage collection operation(s).

Runtime environment 150 can include direct memory control component 130 to facilitate direct memory control operations on memory data structures 128 in computer system 110. In various implementations, direct memory access control component 130 can be invoked by components of runtime environment 150 (e.g., application component 154, garbage collection component 152, etc.) to provide direct access to and/or direct control of memory data structures 128 without utilizing standard interfaces, thereby eliminating the execution of extraneous or otherwise unnecessary instructions performed by standard interfaces (e.g., standard system calls). This access can be provided via the implementation of a specialized application programming interface (API) that provides access to the memory data structure controller 125 to obtain addressing information for elements of memory data structures 128. Once the addressing information has been obtained, direct memory control component 130 can access and/or modify the elements of memory data structures 128 directly without repetitive invocations of memory data structure controller 125 or invoking a system call using a standard interface. Direct memory control component 130 is described in further detail below with respect to FIGS. 2-3.

In some implementations, direct memory control component 130 and the specialized API to memory data structure controller 125 can be deployed to a runtime environment 150 that is separate from host OS 120. Alternatively, direct memory control component 130 and specialized API to memory data structure controller 125 can be deployed in a unikernel (e.g., unikernel 170). Unikernel 170 can be a specialized implementation that combines the application runtime 150 with host OS 120 for a particular purpose. In such implementations, the application runtime 150 and host OS 120 can be deployed as a single entity that operate within a single address space, eliminating any segregation between user space and operating system (e.g., kernel) space. In unikernel implementations, the compiler can generate unikernel 170 such that the instructions of direct memory control component 130 can be incorporated into the components that may access it (e.g., application component 154, garbage collection component 152, etc.). In such instances, components 152/154 can be provided with inline access to the instructions for memory control component 130, and thereby, inline access to the memory data structures 128 directly without the intervention of the host OS 120.

Figure 2:
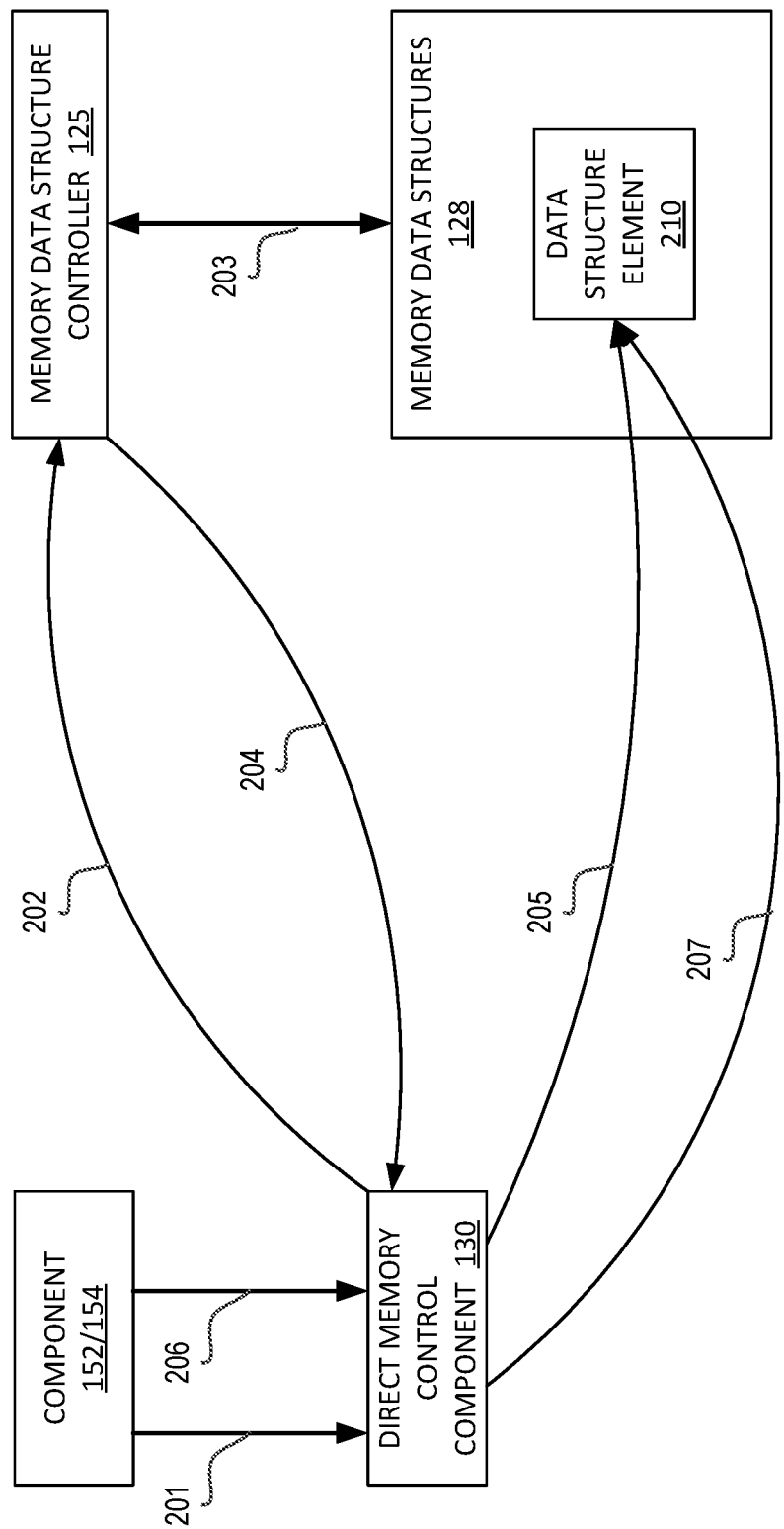
FIG. 2 depicts an illustration of a hardware configuration generation workflow that utilizes configuration data, in accordance with one or more aspects of the present disclosure.

FIG. 2 depicts an illustration of a direct memory control component 130 that facilitates direct memory control operations on memory data structures, in accordance with one or more aspects of the present disclosure. As shown in FIG. 2, a component 152/154 invokes direct memory control component 130 to perform direct memory control operations of memory data structures 128. In various implementations, component 152/154 can correspond to garbage collection component 152 or application component 154 of FIG. 1.

As shown in FIG. 2, component 152/154 sends a request 201 to direct memory control component 130 to perform a memory access operation on a portion of memory associated with component 152/154. In various implementations, the memory access operation can include a garbage collection operation, a memory relocation operation, a memory allocation operation, a memory protect operation, a memory unprotect operation, or the like. Direct memory control component 130 can then determine a data structure address for data structure element 210 that is associated with the portion of memory to be accessed. In various implementations, memory data structures 128 can be configured as a page table tree, where data structure element 210 is a node in the tree.

As shown, direct memory control component 130 can determine the data structure address of data structure element 210 by sending request 202 to memory data structure controller 125. As noted above, direct memory control component 130 can make this request using an interface that is configured to access memory data structure controller 125 directly, bypassing a standard system call interface. The request 202 can include information associated with the portion of memory that direct memory control component intends to access (e.g., the virtual memory address associated to be accessed by component 152/154). Memory data structure controller 125 can perform operation 203 to access memory data structures 128 using the virtual address information to identify the data structure address of data structure element 210 (the node of the page table tree associated with the portion of memory identified by the virtual address).

Direct memory control component 130 can receive response 204 from memory data structure controller 125 that includes the data structure address of data structure element 210. Subsequently, direct memory control component 130 can perform memory access operation 205 directly on data structure element 210 using the received data structure address. The performance of the memory access operation is described in further detail below with respect to FIG. 3.

In some implementations, direct memory control component 130 can store the data structure address for data structure element 210 (e.g., in a local memory space, cache, etc.) to be used to service subsequent requests to perform additional operations on the same portion of the memory data structure 128 (e.g., data structure element 210). In such instances, direct memory control component 130 can receive an additional request 206 to perform an additional memory access operation on the same portion of memory. Direct memory control component can retrieve the stored data structure address from local memory instead of invoking memory data structure controller 125 to obtain the data structure address. Subsequently, direct memory control component 130 can perform memory access operation 207 directly on data structure element 210 using the retrieved data structure address. It should be noted that for ease of illustration, a pair of memory access operations have been illustrated in FIG. 2. In other implementations, additional numbers of operations can be performed on the data structure element 210. Additionally, other elements of memory data structures 128 may also be accessed by other requests received from component 152/154. Direct memory control component 130 is described in further detail below with respect to FIG. 3.

Figure 3:
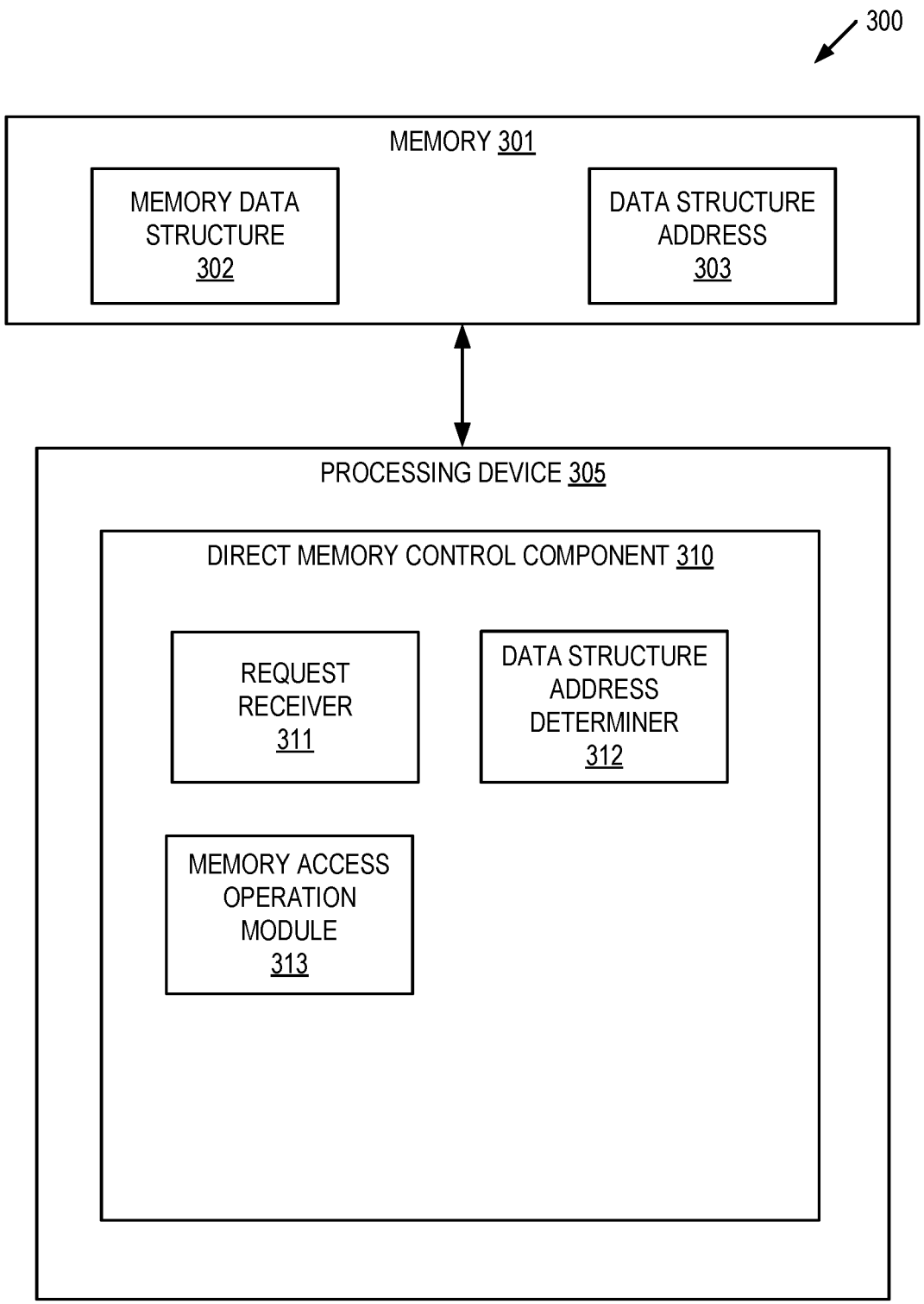
FIG. 3 depicts a block diagram illustrating an example of a direct memory control component for facilitating direct memory control operations on memory data structures, in accordance with one or more aspects of the present disclosure.

FIG. 3 depicts a block diagram illustrating an example of a direct memory control component 410 for facilitating direct memory control operations on memory data structures. In some implementations, direct memory control component 310 may correspond to direct memory control component 130 of FIG. 1. As shown in FIG. 3, direct memory control component 310 may be a component of a computing apparatus 300 that includes a processing device 305, operatively coupled to a memory 301, to execute direct memory control component 310. In some implementations, processing device 305 and memory 301 may correspond to processing device 502 and main memory 504 respectively as described below with respect to FIG. 5. In various implementations, computing apparatus 500 can be a standalone host computing device that communicates with various tenant computing devices. Alternatively, computing apparatus 300 can be a component of a cloud computing environment made up of multiple host computing devices, an Internet of Things (IoT) edge device, or the like. In various implementations, the computing apparatus 300 can be a physical device hosted by a computer system. Alternatively, computing apparatus 300 can be a host computing system that hosts a virtual device that includes the direct memory control component 310.

Direct memory control component 310 can include request receiver 311, data structure address determiner 312, and memory access operation module 413. Alternatively, the functionality of one or more of request receiver 311, data structure address determiner 312, and memory access operation module 413 may be combined into a single module or divided into multiple sub-modules.

Request receiver 311 is responsible for receiving, from a component of an application runtime environment, a request to perform a memory access operation on a portion of a memory space. As described above, the application runtime environment (e.g., runtime environment 150 of FIG. 1) can encompass one or more application components that execute within the environment. For example, application components that are deployed using programming languages such as Java™, Python™, or the like, can be deployed within runtime environments that encompass the application as well as other related components. An application program that modifies or otherwise interacts with memory can cause the runtime environment to perform garbage collection operations on memory spaces that are accessible to the runtime environment. In such instances, request receiver 311 can receive the request from an application component and/or a garbage collection component.

In some implementations, the application runtime environment can be a component of a unikernel (e.g., unikernel 170 of FIG. 1). As noted above, a unikernel is a specialized implementation that combines the application runtime with an operating system for a particular purpose. In such implementations, the application runtime and operating system are deployed as a single entity that operate within a single address space, eliminating any segregation between user space and operating system (e.g., kernel) space.

In various implementations, the requested memory access operation can be a garbage collection operation, a memory relocation operation, a memory allocation operation, a memory protect operation, a memory unprotect operation, or the like. In one example, the request can be received from a garbage collection component that performs garbage collection on the memory space for the runtime environment (or the unikernel). The request can be to relocate a portion of the memory space associated with the runtime environment (e.g., relocate one or more memory pages), change the virtual address associated with a physical memory location to a different value, add another virtual address to access the same physical memory, or the like. Similarly, the request can be received from an application component that performs operations on portions of its allocated memory. For example, request receiver 311 can receive a request from the application component to protect a portion of its memory space (e.g., mark one or more memory pages as protected), unprotect a portion of its memory space (e.g., mark one or more pages as unprotected), or the like.

Data structure address determiner 312 is responsible for determining a data structure address for a portion of a memory data structure, wherein the portion of the data structure is associated with the portion of the memory space. In various implementations, the memory data structure (e.g., memory data structure 302) can be a data structure that is accessible by the CPU (e.g., processing device 305) executing the operating system, runtime environment, unikernel, etc., that maintains the memory space for the particular implementation. For example, the memory data structure can be a page table tree, where each node of the tree is associated with one or more memory pages that are allocated to the runtime environment, unikernel, etc. The page table tree can be used to store a mapping between virtual memory addresses and physical addresses. In other implementations, the memory data structure can be another type of data structure that is used by the CPU (processing device 305).

In some implementations, data structure address determiner 312 can make the determination by sending a request to a data structure controller component of an operating system (e.g., data structure controller 125 in FIG. 1). As noted above, the data structure controller can be a component of an operating system that can be used to by the operating system to interact with the memory data structure. As noted above, the memory data structure controller can be called by other components of the operating system when an application makes a conventional system call. Data address determiner 312 can send a request directly to the memory data structure component directly, thus bypassing a conventional system call. In such instances, an application programming interface (API) can be configured to permit data structure address determiner 312 to make the request directly using the API.

Subsequently, data structure address determiner 312 can receive a response from the data structure controller component, where the response includes the data structure address of the portion of the memory space to be accessed by the component of the runtime environment (e.g., application component, garbage collection component, etc.). In an illustrative example, data structure address determiner 312 can receive address information associated with the page table tree node or nodes associated with the memory page(s) to be accessed. In some implementations, data structure address determiner 312 can store the received data structure address information in a local memory space (e.g., data structure address 303) so that it can be used to service any additional received requests to access the same memory location.

Memory access operation module 313 is responsible for performing, in view of the data structure address, the memory access operation directly on the portion of the memory data structure. As noted above, memory access operation module 313 can use the received data structure address to access and/or modify the memory data structure directly, bypassing a conventional system call. Thus, the additional overhead involved in performing extraneous instructions associated with a system call can be eliminated. For example, memory access operation module 313 can use the data structure address to identify and access a particular page table entry in the page table tree.

In instances where the operation involves a modification of memory, memory access operation module 313 can modify a particular portion of the page table entry accordingly. For example, to protect a memory page, memory access operation module 313 can set an indicator (a particular bit) for the page table entry to indicate that the associated memory page in the memory space is protected. Similarly, to unprotect a memory page, memory access operation module 313 can reset an indicator (a particular bit) for the page table entry to indicate that the associated memory page in the memory space is unprotected. Further, to relocate a memory page, memory access operation module 313 can modify a pointer for the page table entry to indicate that the memory page has been relocated to a different memory location. In other implementations, memory access operation module 313 can perform other memory modification directly on the memory data structure.

In implementations where the operation does not involve modification to memory, memory access operation module 313 can read a particular portion of the page table entry. For example, to verify the validity of a memory page, memory access operation module 313 can access the page table tree using the data structure address to determine if the associated memory page is valid or invalid. In other implementations, other types of memory operations can be performed directly on the memory data structure to retrieve information without modification.

In some implementations, direct memory control component 310 can perform multiple direct access operations on the same data structure address of the memory data structure. For example, if an application protects a memory page, then unprotects that same page, then protects that page again, the same data structure address can be used to perform the subsequent additional operations. As noted above, on first access of a data structure address, that address can be stored in a local memory location (e.g., data structure address 303) to service subsequent requests. Thus, if request receiver 311 receives an additional request to perform an operation on the same memory page, data structure address determiner 312 can use the stored data structure address, bypassing additional requests sent to the memory data structure controller. Memory access operation module 313 can then be invoked to perform the operation directly on the memory data structure using the stored data structure address.

As noted above, in some implementations, the direct memory control component 310 can be implemented with any associated components in the runtime environment (e.g., application components, garbage collection components, etc.) as a unikernel. In such instances, the compilation process can resolve the instructions of direct memory control component 310 such that they are in the same execution space as the operating system. Thus, the benefits of accessing the memory data structure directly can be significantly improved since the application runtime user space and OS/kernel space share the same address space.

Figure 4:
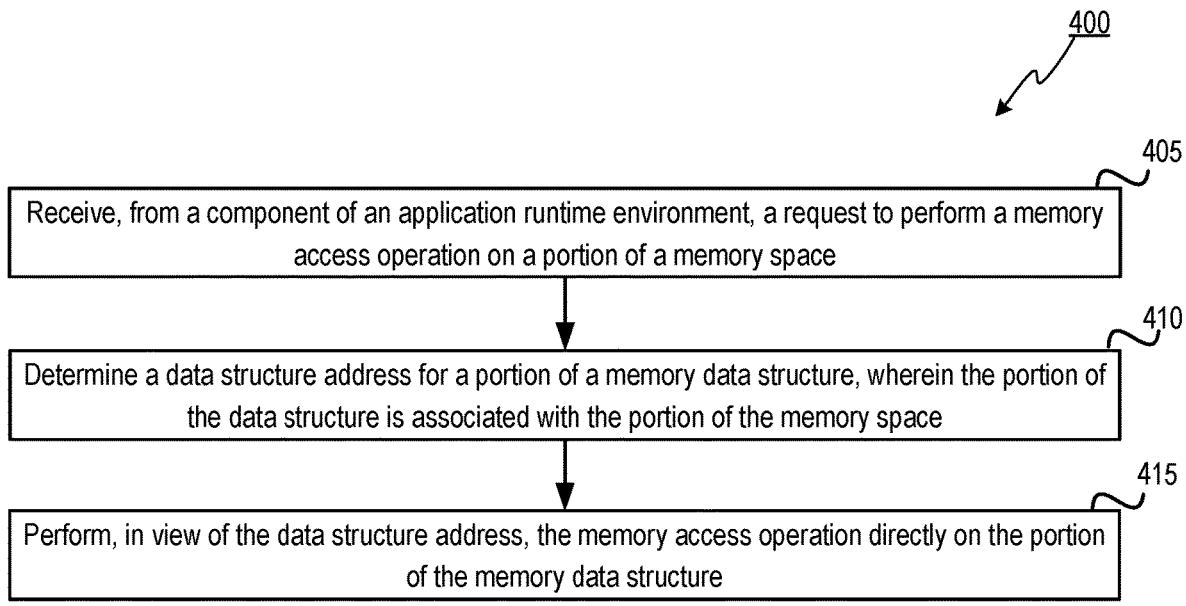
FIG. 4 is a flow diagram of an example method of facilitating direct memory control operations on memory data structures, in accordance with one or more aspects of the present disclosure.

FIG. 4 depicts a flow diagram of an example method 400 for facilitating direct memory control operations on memory data structures, in accordance with one or more aspects of the present disclosure. Method 400 may be performed by processing logic that includes hardware (e.g., circuitry, dedicated logic, programmable logic, microcode, etc.), software (e.g., instructions run on a processor to perform hardware simulation), or a combination thereof. Method 400 or each of its individual functions, routines, subroutines, or operations may be performed by one or more processors of a computer system (e.g., the computer system 110 of FIG. 1) implementing the method. In an illustrative example, method 400 may be performed by direct memory control component 130 in FIG. 1 or direct memory control component 310 in FIG. 3. Alternatively, some or all of method 400 might be performed by another module or machine. Method 400 may be performed by a single processing thread. Alternatively, method 400 may be performed by two or more processing threads, each thread implementing one or more individual functions, routines, subroutines, or operations of the method. In an illustrative example, the processing threads implementing method 400 may be synchronized (e.g., using semaphores, critical sections, or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel or in arbitrary selected orders.

At block 405, processing logic receives, from a component of an application runtime environment, a request to perform a memory access operation on a portion of a memory space. In some implementations the application runtime environment can be a component of a unikernel. In some implementations, the component can be an application component, a garbage collection component, or the like. In various implementations, the memory access operation can include at least one of a garbage collection operation, a memory relocation operation, a memory allocation operation, a memory protect operation, or a memory unprotect operation.

At block 410, processing logic determines a data structure address for a portion of a memory data structure, wherein the portion of the data structure is associated with the portion of the memory space. In some implementations, the memory data structure can be a memory page table tree directly accessible by a processing device that executes the runtime environment.

At block 415, processing logic performs, in view of the data structure address, the memory access operation directly on the portion of the memory data structure. In some implementations, the processing logic can perform the access operation by accessing the memory data structure directly using the data structure address and subsequently modifying a portion of the memory data structure located at the data structure address. In various implementations, modifying the portion of the memory data structure can include at least one of setting an indicator at the data structure address, resetting an indicator at the data structure address, or modifying a pointer associated with the data structure address.

Figure 5:
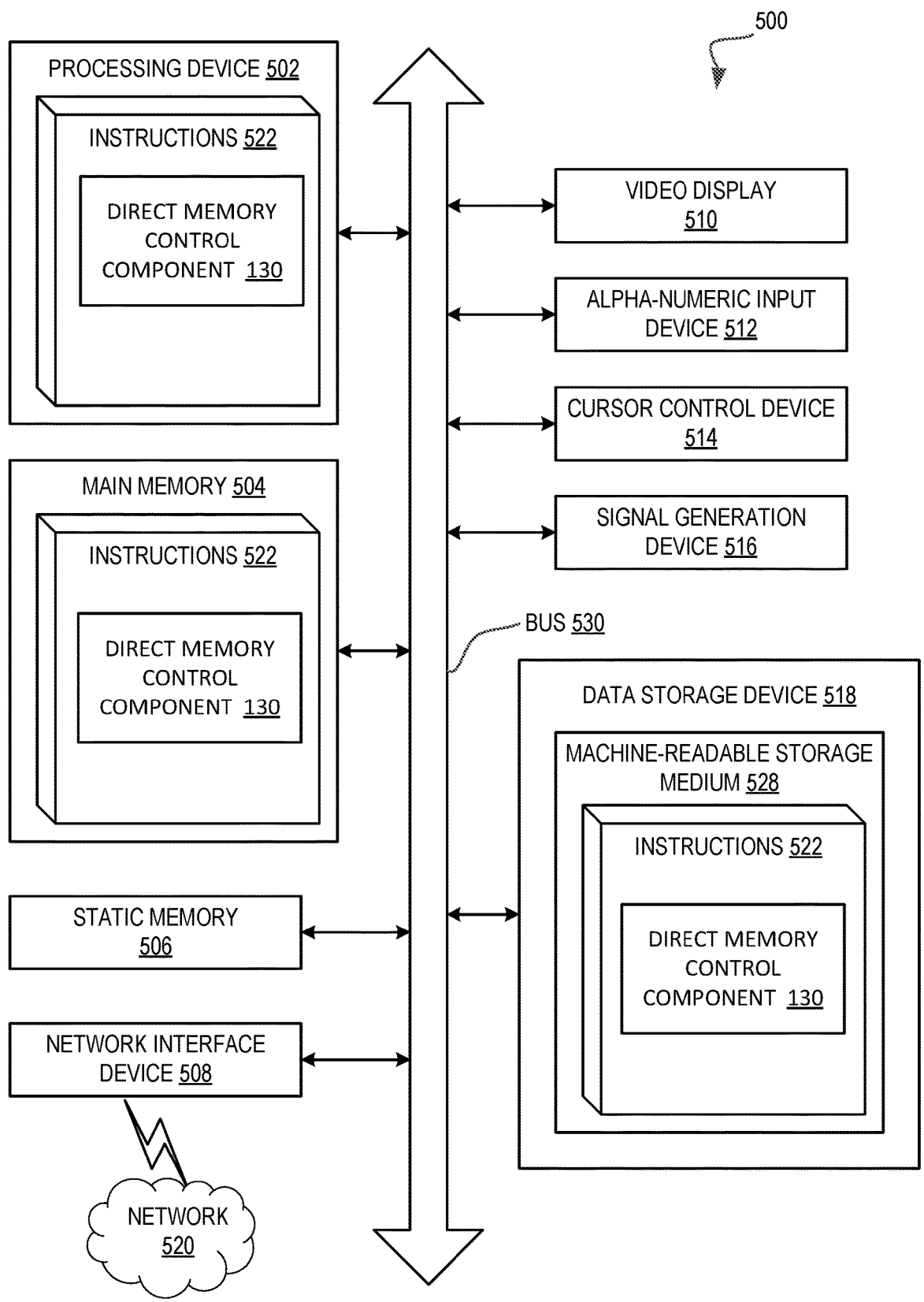
FIG. 5 depicts a block diagram of an illustrative computer system operating in accordance with one or more aspects of the present disclosure.

FIG. 5 depicts a block diagram of a computer system operating in accordance with one or more aspects of the disclosure. In various illustrative examples, computer system 500 may correspond to a computing device within computer system 110 of FIG. 1 and/or apparatus 300 of FIG. 3. The computer system 500 may be included within a data center that supports virtualization. Virtualization within a data center results in a physical system being virtualized using VMs to consolidate the data center infrastructure and increase operational efficiencies. A VM may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 518, which may communicate with each other, as well as with other components of the system via a bus 530.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), a graphics processing unit (GPU), a network processor, or the like).

Computer system 500 may further include a network interface device 508. Computer system 500 also may include a video display unit 510 (e.g., an LCD), an alphanumeric input device 512 (e.g., a keyboard), a cursor control device 514 (e.g., a mouse), and a signal generation device 516.

Data storage device 518 may include a non-transitory computer-readable storage medium 528 on which may store instructions 522 embodying any one or more of the methodologies or functions described herein (e.g., direct memory control component 130). Instructions 522 may also reside, completely or partially, within volatile memory 504 and/or within processing device 502 during execution thereof by computer system 800, hence, volatile memory 504 and processing device 502 may also constitute machine-readable storage media.

While computer-readable storage medium 528 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "sending," "determining," "performing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

What is claimed is:

1. A method comprising:
   receiving, by a processing device, from a component of an application runtime environment, a first request to perform a memory access operation on a portion of a memory space;
   sending, to a data structure controller component of an operating system, via an interface configured to access the data structure controller component directly, a second request for a node address of a node of a page table tree, wherein each node of the page table tree is associated with a corresponding at least one memory page of the memory space, wherein the node of the page table tree is associated with the portion of the memory space, wherein the second request comprises a virtual memory address associated with the portion of the memory space;
   receiving, from the data structure controller component, the node address of the node of the page table tree; and
   performing, in view of the node address, the memory access operation directly on the node of the page table tree, wherein the memory access operation is at least one of multiple memory access operations, and wherein the multiple memory access operations comprise a garbage collection operation, a memory relocation operation, a memory allocation operation, a memory protect operation, and a memory unprotect operation, wherein the application runtime environment is a component of a unikernel.

2. The method of claim 1, further comprising:
   storing, in an additional portion of the memory space, the node address of the node of the page table tree.

3. The method of claim 2, further comprising:
   receiving, from the component of the application runtime environment, an additional request to perform an additional memory access operation on the portion of the memory space;
   retrieving, from the additional portion of the memory space, the node address of the node of the page table tree; and
   performing, in view of the node address, the additional memory access operation on the node of the page table tree.

4. The method of claim 1, wherein performing the memory access operation further comprises setting an indicator for a page table entry to indicate that an associated memory page in the memory space is protected or unprotected.

5. The method of claim 1, wherein performing the memory access operation further comprises:
   accessing the page table tree directly using the node address; and
   modifying a node of the page table tree located at the node address.

6. The method of claim 5, wherein modifying the node of the page table tree comprises at least one of setting an indicator at the node address, resetting an indicator at the node address, or modifying a pointer associated with the node address.

7. The method of claim 1, wherein the operating system is a component of the unikernel.

8. A system comprising:
   a memory; and
   a processing device operatively coupled to the memory, the processing device to:
   receive, from a component of an application runtime environment, a first request to perform a memory access operation on a portion of a memory space;
   send, to a data structure controller component of an operating system, via an interface configured to access the data structure controller component directly, a second request for a node address of a node of a page table tree, wherein each node of the page table tree is associated with a corresponding at least one memory page of the memory space, wherein the node of the page table tree is associated with the portion of the memory space, wherein the second request comprises a virtual memory address associated with the portion of the memory space;
   receive, from the data structure controller component, the node address of the node of the page table tree; and
   perform, in view of the node address, the memory access operation directly on the node of the page table tree,
   wherein the memory access operation is at least one of multiple memory access operations, and wherein the multiple memory access operations comprise a garbage collection operation, a memory relocation operation, a memory allocation operation, a memory protect operation, and a memory unprotect operation.

9. The system of claim 8, wherein the processing device is further to:
store, in an additional portion of the memory space, the node address of the node of the page table tree.

10. The system of claim 9, wherein the processing device is further to:
receive, from the component of the application runtime environment, an additional request to perform an additional memory access operation on the portion of the memory space;
retrieve, from the additional portion of the memory space, the node address of the node of the page table tree; and
perform, in view of the node address, the additional memory access operation on the node of the page table tree.

11. The system of claim 8, wherein the application runtime environment is a component of a unikernel.

12. The system of claim 8, wherein to perform the memory access operation, the processing device further to:
access the page table tree directly using the node address; and
perform at least one of setting an indicator at the node address of the page table tree, resetting an indicator at the node address of the page table tree, or modifying a pointer associated with the node address of the page table tree.

13. The system of claim 8, wherein the operating system is a component of a unikernel.

14. A non-transitory computer-readable media storing instructions that, when executed, cause a processing device to:
receive, from a component of an application runtime environment, a first request to perform a memory access operation on a portion of a memory space;
send, to a data structure controller component of an operating system, via an interface configured to access the data structure controller component directly, a second request for a node address of a node of a page table tree, wherein each node of the page table tree is associated with a corresponding at least one memory page of the memory space, wherein the node of the page table tree is associated with the portion of the memory space, wherein the second request comprises a virtual memory address associated with the portion of the memory space;
receive, from the data structure controller component, the node address of the node of the page table tree; and
perform, in view of the node address, the memory access operation directly on the node of the page table tree, wherein the memory access operation is at least one of multiple memory access operations, and wherein the multiple memory access operations comprise a garbage collection operation, a memory relocation operation, a memory allocation operation, a memory protect operation, and a memory unprotect operation,
wherein the application runtime environment is a component of a unikernel.

15. The non-transitory computer-readable media of claim 14, wherein the processing device is further to:
store, in an additional portion of the memory space, the node address of the node of the page table tree.

16. The non-transitory computer-readable media of claim 15, wherein the processing device is further to:
receive, from the component of the application runtime environment, an additional request to perform an additional memory access operation on the portion of the memory space;
retrieve, from the additional portion of the memory space, the node address of the node of the page table tree; and
perform, in view of the node address, the additional memory access operation on the node of the page table tree.

17. The non-transitory computer-readable media of claim 14, wherein to perform the memory access operation, the processing device further to:
access the page table tree directly using the node address; and
perform at least one of setting an indicator at the node address of the page table tree, resetting an indicator at the node address of the page table tree, or modifying a pointer associated with the node address of the page table tree.

18. The non-transitory computer-readable media of claim 14, wherein the operating system is a component of the unikernel.

* * * * *